United States Patent
Turski et al.

(10) Patent No.: US 7,911,080 B2
(45) Date of Patent: Mar. 22, 2011

(54) METHOD AND SYSTEM FOR MANAGING AN AUTOMOTIVE ELECTRICAL SYSTEM

(75) Inventors: Karin L. Turski, Rochester Hills, MI (US); Rod Niner, Royal Oak, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 223 days.

(21) Appl. No.: 12/260,752

(22) Filed: Oct. 29, 2008

(65) Prior Publication Data

US 2010/0102630 A1 Apr. 29, 2010

(51) Int. Cl.
*H02H 7/18* (2006.01)

(52) U.S. Cl. .................................... 307/10.7; 307/10.1

(58) Field of Classification Search .................. 307/9.1, 307/10.1, 10.7; 320/104, 135, 136; 713/300, 713/320

See application file for complete search history.

(56) References Cited

U.S. PATENT DOCUMENTS

| | | | |
|---|---|---|---|
| 5,960,327 A * | 9/1999 | Eaton et al. ................... | 340/7.37 |
| 2001/0040441 A1* | 11/2001 | Ng et al. ........................ | 320/104 |
| 2009/0056354 A1* | 3/2009 | Davis et al. ..................... | 62/236 |
| 2009/0313484 A1* | 12/2009 | Millet et al. ................... | 713/300 |

* cited by examiner

*Primary Examiner* — Jared J Fureman
*Assistant Examiner* — Daniel Cavallari
(74) *Attorney, Agent, or Firm* — Ingrassia Fisher & Lorenz, P.C.

(57) ABSTRACT

An automotive electrical system and a method for managing an automotive electrical system including a battery are provided. A state of charge of the battery is determined. An electrical system function is prevented from being performed based on the determined state of charge of the battery.

15 Claims, 2 Drawing Sheets

METHOD AND SYSTEM FOR MANAGING AN AUTOMOTIVE ELECTRICAL SYSTEM

TECHNICAL FIELD

The present invention generally relates to automotive electrical systems, and more particularly relates to a method and system for managing automotive electrical systems.

BACKGROUND OF THE INVENTION

In recent years, advances in technology, as well as ever-evolving tastes in style, have led to substantial changes in the design of automobiles. One of the changes involves the complexity of the electrical systems within automobiles. In addition to the conventional electrical system features such as headlamps, windows, and door-locks, automobiles are now often equipped with advanced computer systems that may include Global Positioning System (GPS) components, media file storage, and wireless communication systems.

The more advanced electrical system features may at times perform various operations when the vehicle (or an internal combustion engine within the vehicle) is not in use (i.e., "turned off"), such as software updates and media file transfers. Depending on the nature of the particular function, a considerable amount of battery power may be required to complete the operation. If the electrical system depletes the battery power beyond a certain threshold, there may be insufficient battery power to start the engine.

Accordingly, it is desirable to provide a method and system for managing the electrical systems of such automobiles in such a way to prevent excessive draining of the battery due to electrical system operations when the vehicle is off. Furthermore, other desirable features and characteristics of the present invention will become apparent from the subsequent description taken in conjunction with the accompanying drawings and the foregoing technical field and background.

SUMMARY OF THE INVENTION

A method for managing an automotive electrical system including a battery is provided. A state of charge of the battery is determined. An electrical system function is prevented from being performed based on the determined state of charge of the battery.

A method for managing an automotive electrical system including a battery is provided. A signal representative of a request to perform an electrical system function when the automotive electrical system is in a non-operational state is received. A state of charge of the battery is determined. An allowed electrical function duration for the electrical function is determined based on the determined state of charge and a first state of charge threshold. The allowed electrical function duration is compared to a minimum electrical function duration. The electrical system function is prevented from being performed if the allowed electrical function duration is less than the minimum electrical function duration.

An automotive electrical system is provided. The automotive electrical system includes a battery and a processing system coupled to the battery. The processing system is configured to receive a signal representative of a request to perform an electrical system function when the automotive electrical system is in a non-operational state, determine a state of charge of the battery, and prevent the electrical system function from being performed based on the determined state of charge of the battery.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, and brief summary, or the following detailed description.

The following description refers to elements or features being "connected" or "coupled" together. As used herein, "connected" may refer to one element/feature being mechanically joined to (or directly communicating with) another element/feature, and not necessarily directly. Likewise, "coupled" may refer to one element/feature being directly or indirectly joined to (or directly or indirectly communicating with) another element/feature, and not necessarily mechanically. However, it should be understood that although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment.

Further, various components and features described herein may be referred to using particular numerical descriptors, such as first, second, third, etc., as well as positional and/or angular descriptors, such as horizontal and vertical. However, such descriptors may be used solely for descriptive purposes relating to drawings and should not be construed as limiting, as the various components may be rearranged in other embodiments. It should also be understood that FIGS. 1 and 2 are merely illustrative and may not be drawn to scale.

Figure 1:
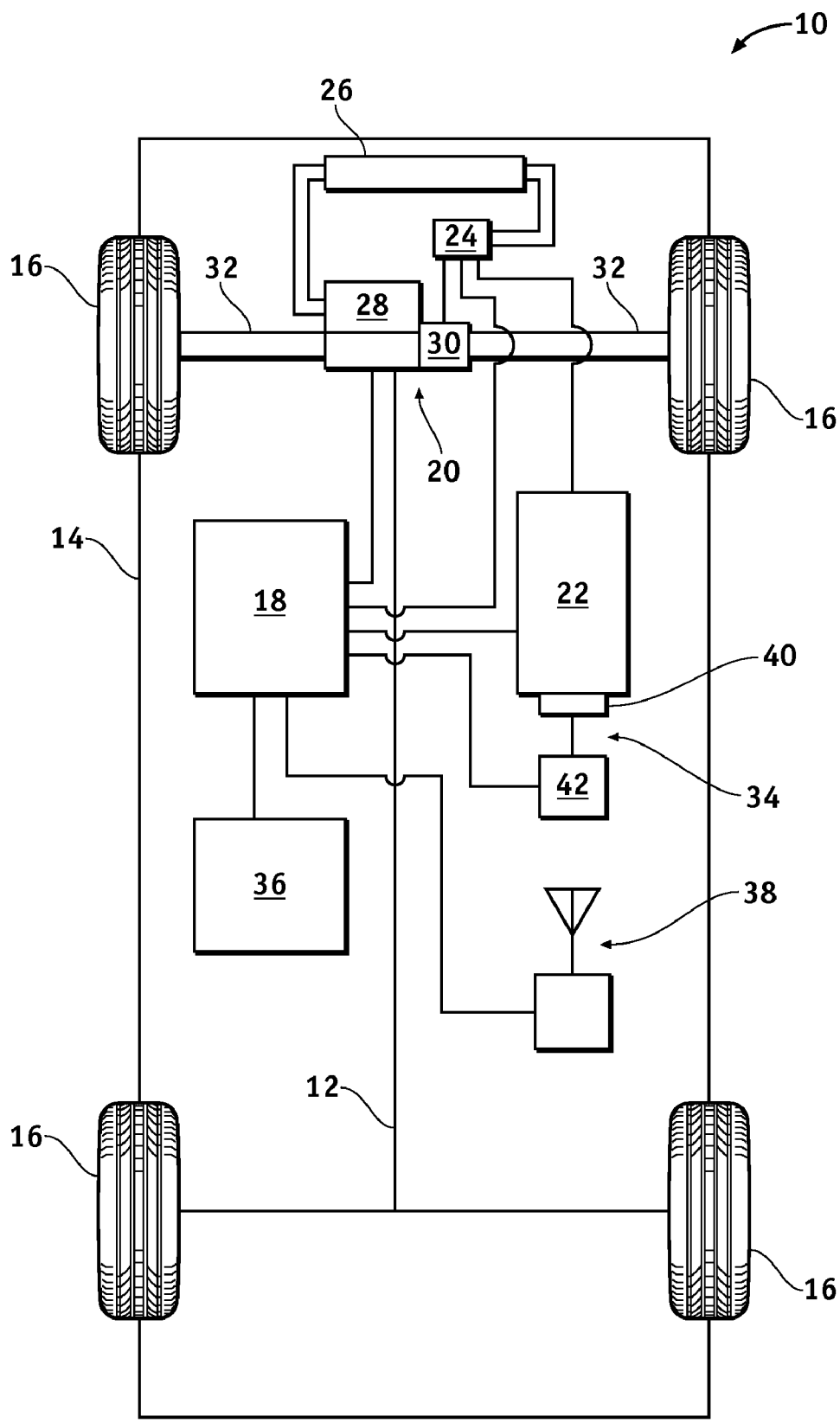
FIG. 1 is a schematic view of an exemplary vehicle according to one embodiment of the present invention.
Figure 2:
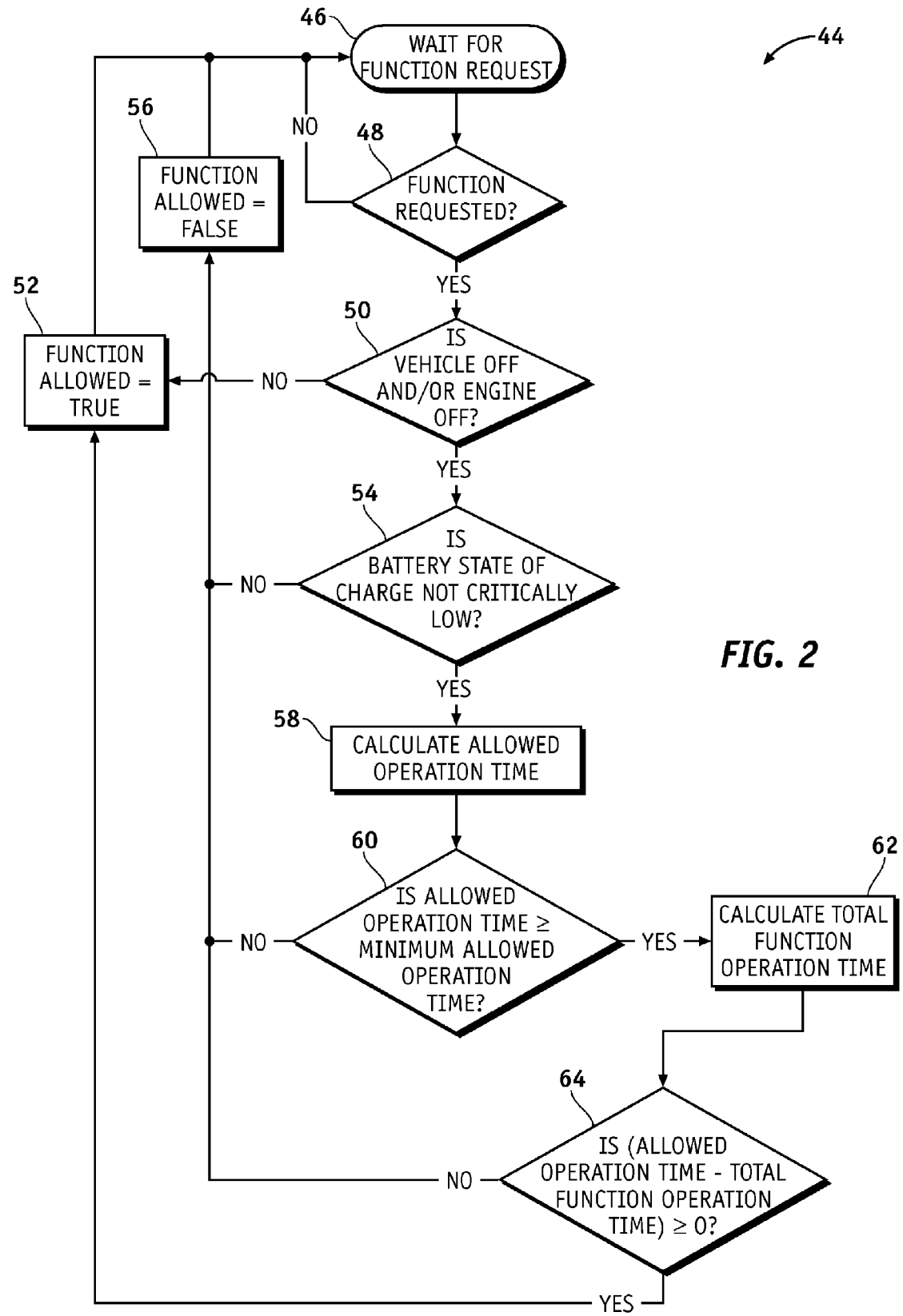
FIG. 2 is a flow chart of a method for managing an electrical system within the vehicle of FIG. 1 in accordance with one embodiment of the present invention.

FIGS. 1 and 2 illustrate a method and system for managing an automotive electrical system having a battery. A state of charge of the battery is determined. An electrical system function is prevented from being performed based on the determined state of charge of the battery.

In one embodiment, the electrical system function is requested when the automotive electrical system (and/or an automobile associated with the automotive electrical system) is in a non-operational state (e.g., OFF). In another embodiment, the electrical system function is initiated when the automotive electrical system (and/or the automobile) is an operational state (e.g., ON), and the operation of the function is ceased based on the state of charge of the battery. The operational state of the automotive electrical system may correspond to the operational state of an internal combustion engine within the automobile.

FIG. 1 illustrates a vehicle (or "automobile") 10, according to one embodiment of the present invention. The vehicle 10 includes a chassis 12, a body 14, four wheels 16, and an electronic control system 18. The body 14 is arranged on the chassis 12 and substantially encloses the other components of the vehicle 10. The body 14 and the chassis 12 may jointly form a frame. The wheels 16 are each rotationally coupled to the chassis 12 near a respective corner of the body 14.

The vehicle 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The vehicle 10 may also incorporate any one of, or combination of, a number of different types of engines, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

In the exemplary embodiment illustrated in FIG. 1, the vehicle 10 is a hybrid electric vehicle (or hybrid vehicle), and further includes an actuator assembly 20, a battery system (or battery) 22, a power converter assembly (e.g., an inverter assembly) 24, and a radiator 26. The actuator assembly 20 includes an internal combustion engine 28 and an electric motor/generator (or motor) 30. As will be appreciated by one skilled in the art, the electric motor 30 includes a transmission therein, and although not illustrated also includes a stator assembly (including conductive coils), a rotor assembly (including a ferromagnetic core), and a cooling fluid (i.e., coolant). The stator assembly and/or the rotor assembly within the electric motor 30 may include multiple electromagnetic poles (e.g., sixteen poles), as is commonly understood.

Still referring to FIG. 1, in one embodiment, the combustion engine 28 and the electric motor 30 are integrated such that both are mechanically coupled to at least some of the wheels 16 through one or more drive shafts 32. The radiator 26 is connected to the frame at an outer portion thereof and although not illustrated in detail, includes multiple cooling channels therein that contain a cooling fluid (i.e., coolant) such as water and/or ethylene glycol (i.e., "antifreeze") and is coupled to the engine 28 and the inverter 24.

Although not shown, the battery system (or direct current (DC) power supply) 22 may include a 12V, lead-acid starter-lighting-ignition (SLI) battery, as well as a high voltage battery suitable for powering the electric motor 30 (e.g., a lithium ion battery). It should be understood that for the purposes of this description, the use of the word "battery" may be referring to either or both of the two battery types referred to above.

Although not shown in detail, in one embodiment, the inverter 24 includes a three-phase circuit coupled to the motor 30. More specifically, the inverter 24 includes a switch network having a first input coupled to a voltage source $V_{dc}$ (e.g., the battery 22) and an output coupled to the motor 30. The switch network comprises three pairs (a, b, and c) of series switches with antiparallel diodes (i.e., antiparallel to each switch) corresponding to each of the phases of the motor 30. As is commonly understood, each of the switches may be in the form of individual semiconductor devices such as insulated gate bipolar transistors (IGBTs) within integrated circuits formed on semiconductor (e.g. silicon) substrates (e.g., die).

Referring again to FIG. 1, in the depicted embodiment, the inverter 24 receives and shares coolant with the electric motor 30. The radiator 26 may be similarly connected to the inverter 24 and/or the electric motor 30. The electronic control system 18 is in operable communication with the actuator assembly 20, the high voltage battery 22, and the inverter assembly 24.

Although not shown in detail, the electronic control system 18 includes various sensors and automotive control modules, or electronic control units (ECUs), such as an inverter control module and a vehicle controller, and at least one processor and/or a memory which includes instructions stored thereon (or in another computer-readable medium) for carrying out the processes and methods as described below. As is commonly understood, the electronic control system 18 and/or the vehicle 10 may include a user input device (e.g., a key lock) for changing the operational state of the vehicle 10 (e.g., "ON" and "OFF"). The operational state of the vehicle 10 may correspond to the operational state of the internal combustion engine 28. As such, in the embodiment in which the vehicle 10 is a hybrid vehicle, the vehicle 10 may be considered to be in an OFF operational state (i.e., a non-operational state) when both the electrical system and the internal combustion engine 28 are OFF (such as when the vehicle is unoccupied) and/or when the electrical system is ON and the internal combustion engine 28 is OFF (or not in use at that particular time, such as when only the electric motor 30 is being used to drive the wheels 16).

Still referring to FIG. 1, in the depicted embodiment, the vehicle 10 further includes a state of charge determination system (or SOC system) 34, a hard drive 36, and an antenna 38, all of which are in operable communication with the electronic control system 18.

The SOC system 34 includes a sensor array 40 and a SOC module 42. Although not shown in detail, the sensor array 40 may include a current sensor, a voltage sensor, and a temperature sensor located adjacent to the battery 22. The SOC module 42 is in operable communication with the sensor array 40 and in one embodiment includes at least one processor and/or a memory that includes data relating measured properties of the battery 22 to the state of charge of the battery 22. Although not illustrated as such, the SOC module 42 may be integral with the electronic control system 18 and may also include one or more power sources.

Although not shown in detail, hard drive 36 includes a high capacity computer-readable medium and a reader/writer device (e.g., a tape and a tape drive), as is commonly understood. The antenna 38 is a transducer designed to transmit and/or receive electromagnetic waves (e.g., radio waves) in the well-known manner. The antenna 38 may be configured to interact with one or more of various types of wireless communication systems, such as cellular telephone systems and Wireless Local Area Networks (WLANs). The "electrical system" within the vehicle 10 may be understood to include the electronic control system 18, the battery 22, the SOC system 34, the hard drive 36, and the antenna 38 (as well as other components not described here).

During operation, referring to FIGS. 1 and 2, the vehicle 10 is operated by providing power to the wheels 16 with the combustion engine 28 and the electric motor 30 in an alternating manner and/or with the combustion engine 28 and the electric motor 30 simultaneously. In order to power the electric motor 30, DC power is provided from the battery 22 (and, in the case of a fuel cell automobile, a fuel cell) to the inverter 24, which converts the DC power into AC power, before the power is sent to the electric motor 30.

In one embodiment, when the vehicle 10 (and/or the electrical system and/or the internal combustion engine 28) is in an OFF operational state, the electronic control system 18 (perhaps automatically) initiates, or attempts to initiate, an electrical system function, such as transmitting and/or receiving various types of data to and/or from the hard drive 36 through the antenna 38. Examples of such electrical system functions include, for example, remote programming of the electronic control system (e.g., an update to the software code) and transfer of media files such as music files (e.g., Moving Picture Experts Group (MPEG) Audio Layer 3 (MP3) files).

According to one aspect of the present invention, the electronic control system 18 calculates the amount of battery power that the electrical system function will consume and only allows the electrical system function to be performed (or continue to be performed) if the battery power (i.e., battery SOC) after the function is completed is estimated to be above a predetermined threshold.

FIG. 2 illustrates a method (and/or system) 44 for managing the electrical system of the vehicle 10 according to one embodiment of the present invention. At steps 46 and 48, the method 44 begins with waiting for an electrical system function to be requested (e.g., from within the electronic control system 18 or from an external network). Once such a request is received, at step 50, it is determined whether or not the vehicle (and/or the engine) is OFF. If the vehicle is not OFF, the method 44 proceeds to step 52, where the electrical system function is allowed to be performed (i.e., because the engine is running, battery power is not a concern).

If the vehicle is OFF (e.g., the internal combustion engine 28 is OFF), the method 44 proceeds to step 54. At step 54, it is determined whether or not the state of charge of the battery 22 is critically low (i.e., above a first predetermined threshold). The state of charge of the battery 22 is determined using various characteristics (e.g., current flow, temperature, open-circuit voltage) of the battery 22 as measured by the sensor array 40. The SOC module 42 uses these characteristics to determine the state of charge of the battery 22 using known methods. In one embodiment, the battery power (or state of charge) threshold used at step 54 corresponds to a minimum state of charge required to start the vehicle 10 (e.g., start the internal combustion engine 28). As will be appreciated by one skilled in the art, this threshold may vary depending on the type and model of battery used, as well as various characteristics of the vehicle 10.

If the state of charge is critically low, at step 56 the electrical system function is prevented (i.e., not allowed to be performed). If the state of charge is above (i.e., greater than or equal to) the threshold, the method 44 proceeds to step 58. At step 58, the allowed operation time for the function is determined. The allowed operation time may be understood to be the amount of time that the particular electrical system feature is allowed to be performed before the state of charge of the battery 22 drops below a low battery threshold. The allowed operation time may be expressed as $$\text{Allowed\_Operation\_Time} = \left( \frac{\text{Allowed\_Battery\_SOC\_Loss} * 60(\text{min/hour})}{\text{Feature\_Exp\_Current\_Draw}} \right). \quad (1)$$

That is, the allowed operation time for an electrical system function is determined as the allowed loss of battery state of charge (i.e., amp-hours (AH)) divided by the current draw expected by the electrical system function (i.e., amps (A)). The allowed state of charge loss of the battery may be expressed as $$\text{Allowed\_Battery\_SOC\_Loss} = \left( \frac{\text{Off\_Battery\_SOC} - \text{EndOp\_Battery\_SOC} * \text{Battery\_Capacity}}{100\%} \right). \quad (2)$$

That is, the allowed state of charge loss of the battery is determined by multiplying the battery capacity (i.e., AH), which varies depending on the exact type and model of battery, by the difference between the calculated state of charge of the battery and a low battery threshold. The battery power threshold (i.e., a second threshold) used in step 58, in one embodiment, corresponds to a minimum state of charge required for the vehicle 10 to be left OFF for a predetermined amount of time (e.g., 40 days) and still have sufficient battery power to start the vehicle 10 (e.g., start the internal combustion engine). As will be appreciated by one skilled in the art, this threshold may vary depending on the type and model of battery used, as well as various characteristics of the vehicle 10.

Referring again to FIG. 2, at step 60, if the allowed operation time is below (i.e., not greater than or equal to) a minimum allowed operation time (or minimum electrical function duration), the method 44 proceeds to step 56 and the function is not allowed. In one embodiment, the minimum allowed operation time corresponds to a predetermined minimum amount of time required to make the operation of an electrical system function (i.e, not necessarily the requested function) a worthwhile use of battery power. For example, if the minimum allowed operation time is set to 10 minutes and the calculated allowed operation time for the requested function is only 5 minutes at the present battery state of charge, the system will wait until the battery state of charge increases to an acceptable level (e.g., by being charged while running the internal combustion engine 28) to allow the software update to be performed.

If the allowed operation time is greater than or equal to the minimum allowed operation time, the method 44 proceeds to step 62. At step 62, the total operation time of the particular, requested function is calculated (or estimated). One example of the total operation time of the function may be expressed as $$\text{Total\_Feature\_Operation\_Time} = \\ \left( \begin{array}{c} \text{Establish\_Connection\_Time} + \text{Wireless\_Transfer\_Time} + \\ \text{Data\_Processing\_Time} + \text{Commmunicate\_Status\_Time} + \\ \text{Transition\_to\_Sleep\_Time}) \end{array} \right). \quad (3)$$

Equation 3 represents, for example, the total operation time for a wireless transfer of data to the hard drive (such as the transfer of MP3 files via a WLAN). One skilled in the art will appreciate that the total feature operation time, and the exact method used to calculated it, will vary depending on various characteristics of the electronic control system 18, as well as the nature of the particular electrical system function.

After the total operation time is calculated, at step 64 the method 44 subtracts the total operation time from the allowed operation time. If the difference is greater than or equal to zero, the method 44 proceeds to step 52 and the function is allowed. If the difference is less than zero, the method 44 proceeds to step 56 and the function is prevented. That is, if the allowed operation time is greater than or equal to the total operation time, the function is allowed.

As mentioned above, the methods and systems described above may also be used in conjunction with electrical system functions that are initiated when the internal combustion engine 28 is ON. In such embodiments, the method described above may be carried out in such a way that the electrical system function is prevented from continued operation (i.e., ceased) based on the state of charge of the battery 22, as well as the other parameters described above. For example, the function may be prevented from continued operation if the function is initiated when the engine 28 is ON, an attempt is made at continued performance after the engine 28 is turned OFF, and there is insufficient battery power to continue the performance of the function, as described above.

One advantage is that because the system only allows electrical system functions to be performed if the state of charge of the battery is sufficiently high, the likelihood of the battery not having sufficient power to start the vehicle after performing an electrical system function is reduced. In this way, the system facilitates the use of advanced, automatic electrical system features as described above.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for managing an automotive electrical system comprising a battery, the method comprising:
   receiving a signal representative of a request to perform an electrical system function when the automotive electrical system is in a non-operational state;
   determining a state of charge of the battery; and
   preventing the electrical system function from being performed if the determined state of charge of the battery is below a first state of charge threshold,
   wherein the preventing the electrical system function from being performed further comprises:
   determining an allowed electrical function duration for the electrical function based on the determined state of charge of the battery and a second state of charge threshold; and
   comparing the allowed electrical function duration to a minimum electrical function duration,
   wherein the electrical function is prevented if the allowed electrical function duration is less than the minimum electrical function duration.

2. The method of claim 1, wherein the preventing the electrical function from being performed further comprises:
   determining an estimated electrical function duration for the electrical function; and
   comparing the allowed electrical function duration to the estimated electrical function duration,
   wherein the electrical function is prevented if the allowed electrical function duration is less than the estimated electrical function duration.

3. The method of claim 2, wherein the allowed electrical function duration is further based on an expected current draw on the battery caused by the electrical function.

4. The method of claim 2, further comprising allowing the electrical function to be performed if the allowed electrical function duration is greater than or equal to the estimated electrical function duration.

5. The method of claim 2, wherein the electrical function comprises a wireless transfer of data to the automotive electrical system.

6. The method of claim 1, wherein the second state of charge threshold is a state of charge of the battery required to enable the starting of an engine in an automobile after the automobile remains in a non-operational state for a predetermined amount of time.

7. The method of claim 1, further comprising allowing the electrical function to be performed if the allowed electrical function duration is greater than or equal to the minimum electrical function duration.

8. A method for managing an automotive electrical system comprising a battery, the method comprising:
   receiving a signal representative of a request to perform an electrical system function when the automotive electrical system is in a non-operational state;
   determining a state of charge of the battery;
   determining an allowed electrical function duration for the electrical function based on the determined state of charge and a first state of charge threshold;
   comparing the allowed electrical function duration to a minimum electrical function duration; and
   preventing the electrical system function from being performed if the allowed electrical function duration is less than the minimum electrical function duration.

9. The method of claim 8, further comprising:
   determining an estimated electrical function duration for the electrical function;
   comparing the allowed electrical function duration to the estimated electrical function duration; and
   preventing the electrical system function from being performed if the allowed electrical function duration is less than the estimated electrical function duration.

10. The method of claim 9, further comprising preventing the electrical system function from being performed if the determined state of charge of the battery is below a second state of charge threshold.

11. The method of claim 10, wherein the first state of charge threshold is a state of charge of the battery required to enable the starting of an engine in an automobile after the automobile remains in a non-operational state for a predetermined amount of time.

12. The method of claim 11, further comprising allowing the electrical function to be performed if the allowed electrical function duration is greater than or equal to the minimum electrical function duration and the allowed electrical function duration is greater than or equal to the estimated electrical function duration.

13. An automotive electrical system comprising:
   a battery; and
   a processing system coupled to the battery, the processing system being configured to:
   receive a signal representative of a request to perform an electrical system function when the automotive electrical system is in a non-operational state;
   determine a state of charge of the battery; and
   prevent the electrical system function from being performed based on the determined state of charge of the battery, including preventing the electrical system function from being performed if the determined state of charge of the battery is below a first state of charge threshold,
   wherein the preventing the electrical system function from being performed further comprises:
   determining an allowed electrical function duration for the electrical function based on the determined state of charge and a second state of charge threshold; and
   comparing the allowed electrical function duration to a minimum electrical function duration, wherein the electrical function is prevented if the allowed electrical function duration is less than the minimum electrical function duration.

14. The system of claim 13, wherein the preventing the electrical function from being performed further comprises:

determining an estimated electrical function duration for the electrical function; and comparing the allowed electrical function duration to the estimated electrical function duration, wherein the electrical function is prevented if the allowed electrical function duration is less than the estimated electrical function duration.

15. The system of claim 14, wherein the second state of charge threshold is a state of charge of the battery required to enable the starting of an engine in an automobile after the automobile remains in a non-operational state for a predetermined amount of time.

* * * * *